3,048,078
METHOD OF PRODUCING EXTENSIBLE ELECTRIC CABLES

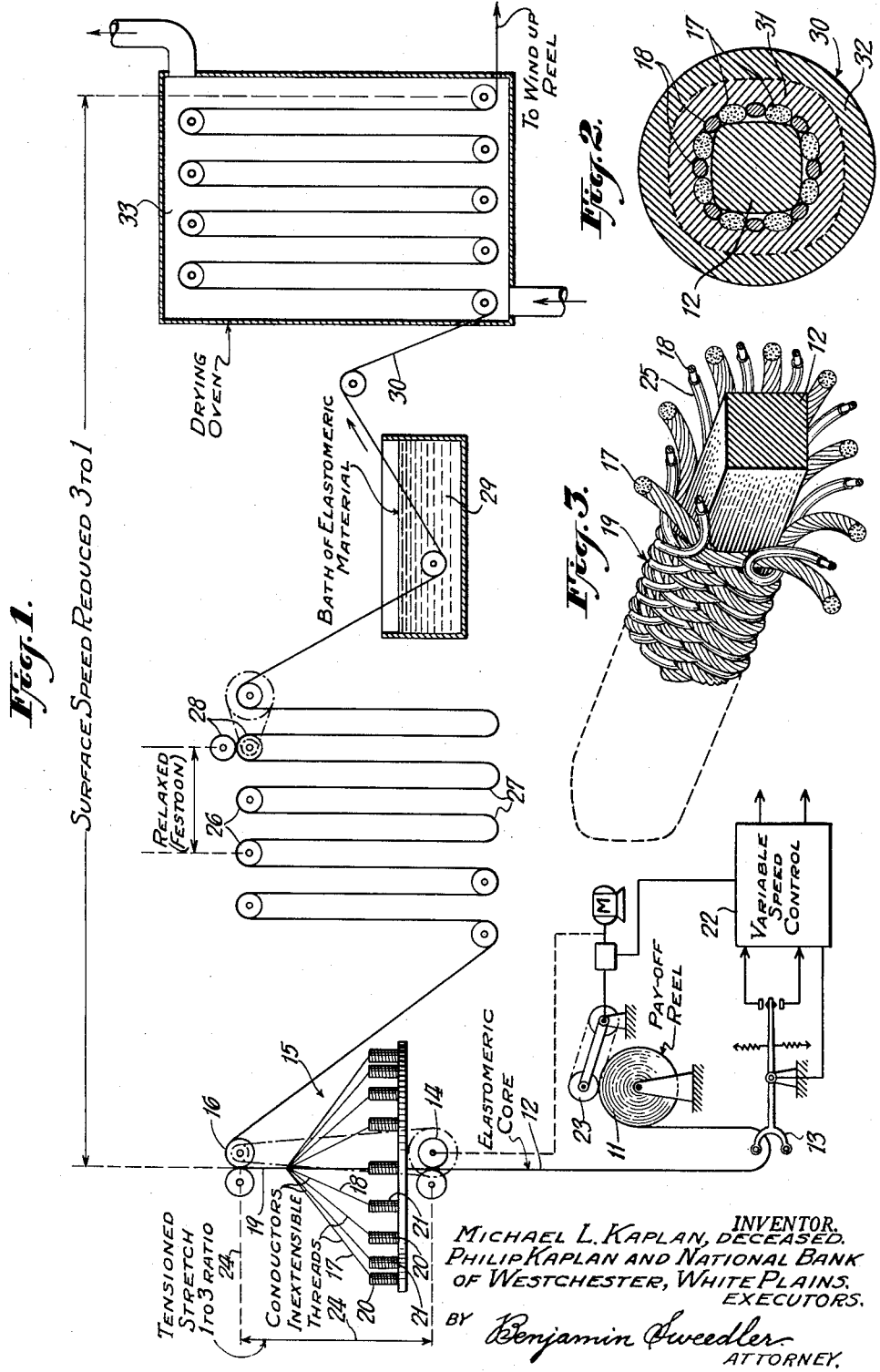

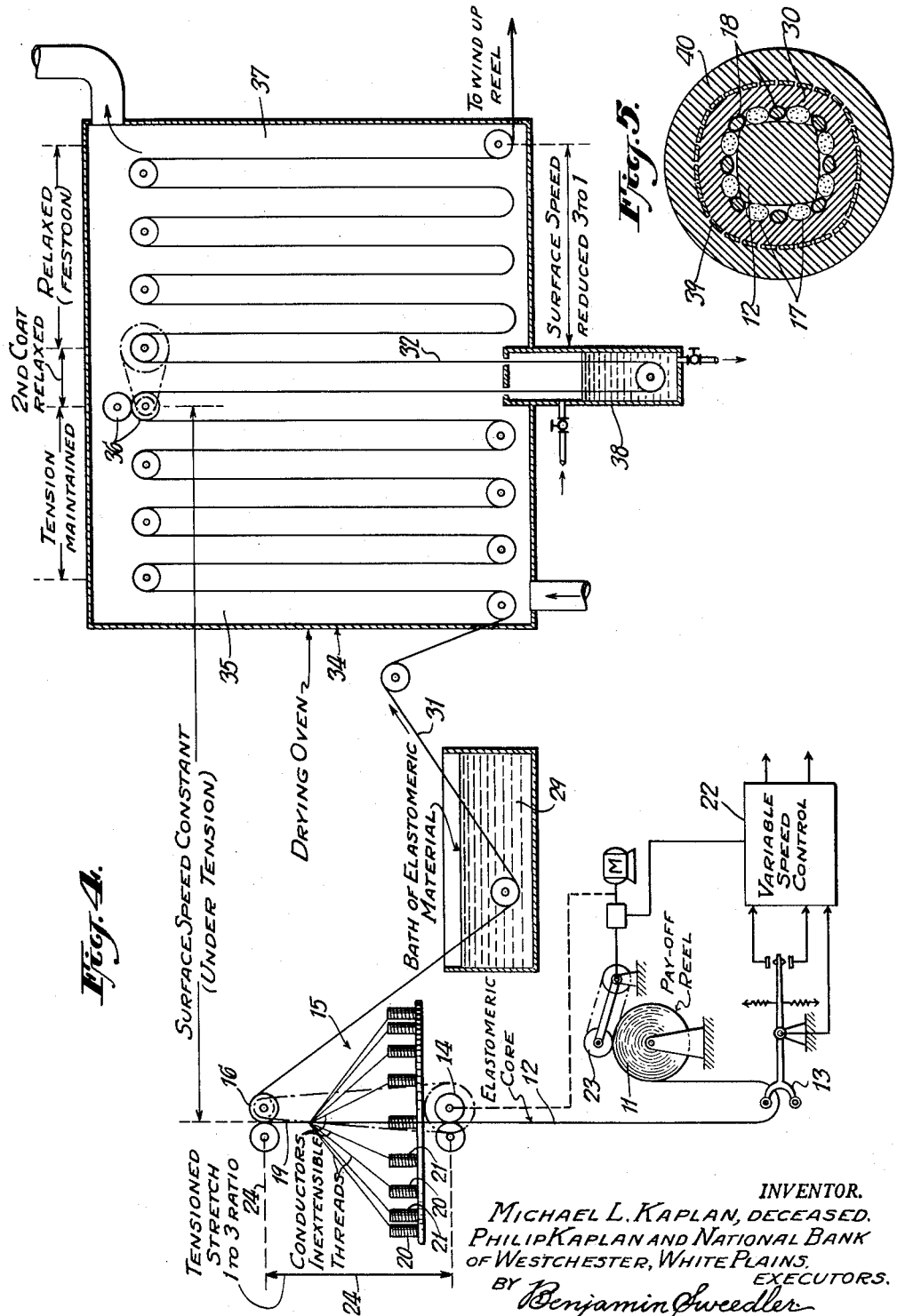

Michael L. Kaplan, deceased, late of New Rochelle, N.Y., by Philip Kaplan, 28 Vaughn Ave., New Rochelle, N.Y., and National Bank of Westchester, White Plains, P.O. Box 1072, White Plains, N.Y., executors
Filed Apr. 29, 1960, Ser. No. 25,646
7 Claims. (Cl. 87—1)

This invention relates to a method of producing an extensible electric cable, and more particularly, to a method of producing such a cable having an elastomeric core with an electrical conductor provided in a sheath covering the core. This application is a continuation-in-part of copending application, Serial No. 703,370, filed December 17, 1957, now Patent No. 3,014,087.

Extensible electric cables, in which a rubber core has associated therewith an electrical conductor wound about the core, usually in the form of a herring-bone or helical winding on the core, are known. In such extensible cables as heretofore produced, the rubber core served the double function of permitting stretch of the cable to take place and causing such cable to return to the relaxed state. One major difficulty encountered with such cables is that the stretch is not controlled; at times the cable may be stretched beyond the elastic limit of the core or to an extent to place undesirable stresses on the conductor resulting in a breaking or snapping of the conductor.

It is among the objects of the present invention to provide a novel method of producing a stretch or extensible cable which method results in a cable having a built-in control on the extent to which the cable may be stretched, and thus serves to minimize, if not prevent, a stretching of the cable thus produced to the point at which undesirable stresses and strains are exerted on the cable components.

Another object of the invention is to provide such method of cable production which is efficient and economical to practice.

Still another object is to provide an efficient and economical method of producing a stretch or extensible cable having an outer insulating sheath impervious to moisture which sheath has good heat resistance and resistance to vibration and shock.

Other objects and advantages of the present invention will be apparent from the following detailed description thereof.

The method of producing extensible cable of this invention comprises continuously feeding a core of an elastomeric material, placing the core under tension to stretch it to a predetermined extent within the range of from at least 50% of its length in the relaxed state to below the elastic limit of the core, depending upon the desired amount of stretch in the final product, i.e., the maximum stretch for which the cable is designed or to which it should be subjected in use, and while thus stretched, braiding a sheath of conductors and inextensible threads on the stretched core. Thereafter, the tension on the extensible core is released, permitting it to return to its relaxed state and causing the braided sheath to contract with the core. The thus braided sheath is extensible when the cable is again extended. However, the sheath permits the cable thus produced to be extended to the point and, as a practical matter, only to the point, of the original elongation of the braided sheath formed thereon. In other words, the inextensible textile threads which are a component of the braided sheath and the interlocking arrangement of the braid provide a built-in control permitting the extensible cable to be stretched to the length, and only to the length, the sheath occupied when formed in the stretched condition.

After the tension on the extensible core is released and the core and the braided sheath contract to the core's relaxed position, it is preferred to form an insulating sheath thereover. Such sheath is preferably formed by applying a layer or layers of an extensible elastomeric insulating material atop the relaxed braided structure. Alternatively, the tension on the elastomeric core may be maintained until at least one layer of the insulating material is applied atop the braided sheath, the tension may then be released and additional layers of the insulating sheath may be applied to the relaxed, contracted cable. While either such procedure effectively fills the interstices and openings within the braided sheath and strongly adheres the insulating sheath to the cable, the former procedure is preferred for its economy and simplicity of operation.

In the accompanying drawings forming a part of this specification and showing for purposes of exemplification preferred embodiments of the invention, without limiting the claimed invention to such illustrative embodiments:

FIGURE 1 is a diagrammatic layout of the equipment for practicing a preferred procedure for producing extensible cable according to the invention;

FIGURE 2 is a vertical section through an extensible cable produced according to the method of the invention, having an elastomeric insulating sheath on its periphery;

FIGURE 3 is a perspective view of the cable, with the insulating sheath removed, illustrating the interlocking character of the inextensible threads and the insulated conductors braided to form the braided conducting sheath which controls the extensibility of the cable;

FIGURE 4 is a diagrammatic layout of the equipment for practicing an alternative procedure in which the insulating sheath is partially applied to the cable while the cable is in the extended or stretched state; and FIGURE 5 is a vertical section through an extensible coaxial cable produced according to the present method.

In FIGURE 1 a layout of equipment for practicing the preferred procedure according to the present invention is shown diagrammatically. As shown in this figure, a reel 11 of an elastomeric core material 12 is passed through a slack take-up device 13 of any well known type to a first pair of feed rollers 14, and thence through a conventional braiding machine 15 to a second pair of feed rollers 16 driven at a speed higher than the rate of speed of the feed rollers 14.

In the braiding machine 15 a number of inextensible threads 17 and conductors 18 are braided on the stretched core to form a braided sheath 19 thereon. The inextensible threads and conductors are wound on the core from spools 20 and 21, respectively, and are so interlaced as to provide a construction which may aptly be characterized as a lock-type braid controlling the extensibility of the cable, as will be more fully described hereinafter.

As shown diagrammatically in the drawing, a conventional variable speed control 22 controls the operation of the pay-off reel 11 to continuously supply elastomeric core material 12 to the feed rollers 14. The rate of feed of the core from reel 11 is controlled by the pay-off feed roller 23 through the variable speed control mechanism so as to always provide some slack below feed rollers 14, but to prevent too large an excess from accumulating. The core material below the feed rollers 14 is in the relaxed state.

The feed rollers 16 are driven from the motor M which also effects actuation of the elastomeric core material feed from the pay-off reel 11 and the feed rollers 14 at a peripheral speed one-third that of the feed rollers 16. The driving connections from feed rollers 14 to feed rollers 16 are shown in broken lines on FIGURES 1 and 4. This differential in peripheral speeds between rollers 14 and 16 causes a 300% elongation of the core as it passes through the braiding machine 15 as indicated by the line 24 bearing the legend "tensioned stretch 1 to 3 ratio."

This elongation is, of course, illustrative; any desired elongation within the range of from at least 50% of the core's length in the relaxed state to below the core's elastic limit may be effected depending upon the type of extensible cable desired. Usually, the core is stretched to from about 50%, to about 500% of its length in the relaxed, unstretched state so that the cable produced therefrom may be stretched to increase its length from about one and one-half to five times its original length.

The braided sheath 19 is formed on the stretched core 12 as the core passes through the braiding machine 15; this sheath serves to control the extensibility of the cable produced by the present method. Existing braiding machines are usually designed to operate with 12, 16, 24 or 32 feeds (i.e., threads) simultaneously to produce a braided sheath. These known machines may be employed in practicing the present method. Either 6, 8, 12 or 16 each of the inextensible threads and the conductor wires may be fed simultaneously, as from spools 20 and 21, respectively, to the tensioned core so that the braided sheath is produced continuously thereon as the core moves continuously through the machine 15.

The braided sheath is formed with openings between the adjacent inextensible threads and conductors; upon subsequent release of the tension on the stretched core, as will be described hereinafter, the sheath contracts to form a tight uniform covering free from wirnkling or buckling.

Thus, by stretching the core 11 to a predetermined extent within the range of from at least 50% of the core's relaxed length to below its elastic limit, and producing the braided sheath 19 thereon while in this stretched condition, the braided sheath controls the amount of elongation to which the finished cable can be subjected. Once the sheath 19 is stretched to the same extent as the distance occupied by the sheath when formed on the extensible core 12, it can not be stretched, as a practical matter, beyond this point because the interlocking braided construction prevents this. The core 12 functions to return the stretched cable to its relaxed state. It is important to note it (the core) does not function to control the extent of elongation or extensibility. This is controlled entirely by the braided sheath 19 formed on the core.

In one embodiment, particularly when the braided sheath 19 is formed with conductors having insulating coatings 25 (see FIGURE 3), the tension on the braided core is released, and the resultant cable is thereafter cut into lengths and provided with suitable terminals, such as spades, jacks, or clip terminals.

In accordance with the preferred procedure of the invention, however, after the core having the braided sheath 19 thereon is fed through the feed rollers 16 (see FIGURE 1), the tension is released by passage over festooning rollers 26, the braided core contracting from the stretched or extended state and forming relaxed loops or festoons 27. The relaxed braided material is thereafter fed by feed rollers 28 through a bath 29 of elastomeric material so that it is flow-coated with an insulating sheath 30. If desired, the relaxed core may be passed through one or more additional baths of elastomeric material to provide plural layers of the insulating coating (see layers 31 and 32 in FIGURE 2) prior to curing. From the bath 29 the thus coated relaxed cable passes thorugh a drying oven 33 where the coating previously applied is set or cured.

Two or more additional coatings may be applied in the same manner as above, with an intermediate curing or setting treatment after each application of elastomeric insulating coating. In such case a multiple stage drying oven 34, such as is depicted in FIGURE 4, discussed hereinafter, may be employed.

Extensible cables thus produced having insulating sheaths of elastomeric material are cut to the desired lengths and provided with suitable terminals.

FIGURES 2 and 3 illustrate an extensible cable produced by the method of the present invention, including an elastomeric core 12 surrounded by a braided sheath 19 composed of inextensible threads 17 and conductors 18, which sheath may be covered with an insulating sheath 30, as shown in FIGURE 2, comprising layers 31 and 32.

The core 12 may be circular or polygonal in cross-section and is composed of any suitable elastomeric material which can be stretched at least 50% from its relaxed length without exceeding its elastic limit. Such materials include the silicone rubbers, neoprene, natural rubber, butadiene-styrene copolymers (e.g., buna S), butadiene-acrylonitrile copolymers (e.g., buna N), polyvinyl chlorides, polyethylenes, or other elastomers.

The substantially inextensible threads 17 may be of nylon, polyester, rayon, silk, mercerized cotton or asbestos fibers. The tensile strength of the threads should be so chosen that the threads are strong enough for the intended purpose. Nylon threads are generally preferred because of their high tensile strength. In the case of extensible cables incorporating silicone rubber materials, threads made from Dacron polyester fibers (polyethylene terephthalate) are preferred.

The conductors 18 may be of copper, nickel, chromium, silver, aluminum, or alloys of these metals. Desirably the conductor wires are insulated; the insulation being indicated at 25 in FIGURE 2. For example, Sodereze wire, i.e., wire coated with polyurethane, which forms a flexible insulating film, is suitable. Also the Formvar (polyvinyl acetate) coated wires may be used. The Formvar insulated wires may be produced by passing the wire through a bath of polyvinyl acetate, then curing at about 700° F. and repeating to form the desired number of coats of Formvar, usually from 3 to 16. Teflon (polytetrafluoroethylene) coated wires may also be used in forming the braided sheath as well as conductor wires coated with insulating varnishes.

The use of insulated conductor wires in forming the braided sheath results in an extensible cable useful in many fields which cable does not have the separate or additional insulating sheath 30 shown in FIGURE 2. Even in the case of cables having an elastomeric insulating sheath bonded to the braided sheath, it is preferred to use insulated wire in forming the braided sheath, chiefly because the use of such insulated wire results in a better product, invariably meeting specifications for household and industrial uses.

The number of windings of inextensible threads and hence also of the conductor wires (the same number of each is usually employed) per relaxed inch of cable, employed in producing the sheath is expressed by the following equation:

$$N = \frac{S(W+D)}{3.3Y}$$

In this equation:

$N$ = the number of windings of inextensible threads and hence also of the conductor wires (substantially the same number of each is used) per relaxed inch of cable.

$S$ = the desired maximum amount of stretch expressed in percent elongation of the cable from the relaxed state; thus, if the amount of stretch is such as to extend the cable to double its relaxed length $S=100$, if to triple its relaxed length $S=200$, if to one and one-half its relaxed length $S=50$.

$Y$ = the maximum core cross-sectional dimension in the relaxed state, expressed in sixteenths of an inch, viz., the diameter of the elastomeric core in the case of a cylindrical core and the equivalent of the diameter, i.e., the cross-sectional extent in the case of a core polygonal in cross-section; $Y=1$ for $\frac{1}{16}$ inch core and is proportionately larger for a core of larger diameter, or larger cross-sectional extent, and proportionately smaller for a core of smaller diameter or smaller cross-sectional extent; thus for a ⅛ inch diameter core $Y=2$, for a ¼ inch diameter core $Y=4$, and for a 1/32 inch diameter core $Y=½$.

$W+D=$ a parameter expressing the sum of the cross-sectional area of the conductor wire and the denier of the inextensible textile threads as compared to No. 40 wire (area 9.9 circular mils) and 100 denier textile threads, for which $W+D$ equals 1. $W+D$ is proportionately larger or smaller for larger or smaller cross-sectional area wires and for larger or smaller denier threads, respectively; thus for 37 wire (area 19.8 circular mils) and 200 denier threads, $W+D=2$, etc. It will be understood that when using wire or threads, which are not circular in cross-section, the cross-sectional area converted to circular mils is utilized for purposes of calculating the number of windings of threads and conductor wires per relaxed inch of cable in accordance with the above formula.

Thus, if a cable having a maximum elongation of 200% is desired, employing a silicone rubber core having a diameter of 1/16 inch and 100 denier nylon threads and copper wire of size 40, 60 windings of the copper wire and the nylon threads are applied per relaxed inch of cable. If a cable having a maximum elongation of 100% is desired, using the same type of nylon thread and copper conductor wire, 30 windings of each of the nylon thread and the conductor wire are applied per relaxed inch of cable. If a maximum elongation of 400% is desired, 120 windings of the conductor wire, size 40, and the nylon thread of 100 denier are applied per relaxed inch of silicone rubber core.

If the cross-sectional area of the conductor wire is doubled and also the diameter of the nylon thread, 30 windings of such wire and nylon thread are applied per relaxed inch of silicone rubber core of 1/16 inch diameter, and a cable having a maximum elongation of 50% is obtained.

The insulating sheath 30, preferably applied as a protective coating atop the braided sheath 19, comprises an elastomeric material such as a silicone rubber, neoprene, natural rubber, a copolymer of butadiene with acrylonitrile or styrene, a polyvinyl chloride, a polyethylene, etc. The material should have the ability to stretch sufficiently, without injury to the insulating sheath, to permit the cable to be extended to the maximum length for which it is designed, as hereinabove described, i.e., an extended length equal to the stretched state of the cable when the braided sheath is formed thereon. As shown in a greatly enlarged scale in FIGURE 2, the insulating sheath 30 includes two layers 31 and 32, applied in sequential baths of elastomeric material; it will be understood, however, that any desired number of such layers may be employed.

FIGURE 4 illustrates a diagrammatic layout depicting an alternative procedure according to the invention wherein a first coating of an elastomeric material is applied to the core 12 having the braided sheath 19 thereon, while still in the extended state. According to this procedure, the core is braided by passage through the braiding machine 15, as described in connection with FIGURE 1. The braided core is fed over the feed rollers 16 in the extended state, as described hereinabove, and then passed directly through the bath 29 of elastomeric material so that it is flow-coated while the braided sheath is extended to substantially its maximum extent. From this bath the thus coated step-product passes through a first stage 35 of the multiple-stage drying oven 34 where the coating applied is set or cured. The step-product passing through the first stage is maintained under tension, i.e., in the extended state until it reaches feed rollers 36. Once it passes the feed rollers 36 the tension is released. Feed rollers 36 are driven at the same peripheral speed as rollers 16 so that the sheathed core is maintained under uniform tension while the braided sheath 19 is formed thereon and while passing from feed rollers 16 up to and through feed rollers 36; thereafter the feed of the partially coated product is at a rate corresponding to the rate of feed from the pay-off reel 11 so that the step-product is no longer under tension. The wind-up reel from a second stage 37 of the dryer may be driven to feed the step-product through the second stage; this step-product is fed in the relaxed state. Alternatively, a pair of feed rollers (not shown) may be provided for this purpose.

From the feed rollers 36, the partially coated product passes through a second coating bath 38, desirably of the same composition as bath 29. From the bath 38 the coated product passes through the second stage dryer 37. It will be noted the second coating layer is applied while the step-product is in the relaxed state. Two or more additional coatings may be applied in the same manner with an intermediate curing or setting treatment after each application of elastomeric insulating coating. The coated cables are then cut to length and provided with suitable terminals.

A preferred embodiment of the invention involves utilization of silicone rubber elastomers for forming the insulating sheath 30 and the core 12 of the extensible cable. It is preferred to use the same silicone rubber elastomer for each of the above elements of the cable so that differential stresses arising from extending or stretching a core and an insulating sheath having different moduli of elasticity will not be produced.

The silicone rubbers utilized produce extensible cables which are inert to temperatures ranging from $-150°$ C. to $475°$ C., are resistant to chemical attack, and can be produced in a range of hardnesses from Shore A 35 to 95 and elasticities facilitating from 50% to 700% elongation within their respective elastic limits.

The silicone rubber elastomers employed in the present invention are mixtures formed by milling methyl silicone polymers with appropriate fillers, such as silica, titania, zinc oxide or iron oxide, and with vulcanizing catalysts, such as benzoyl peroxide or other organic peroxides. The methyl silicone polymers (methylpolysiloxanes) are prepared in the conventional manner, as by hydrolyzing chlorosilanes such as methyltrichlorosilane, dimethyldichlorosilane, or methylphenyldichlorosilane, and "bodying" the resin solutions to produce the corresponding polysiloxanes. Methods of producing such polymers are more fully disclosed, for example, in "Silicones" by Meals and Lewis, Reinhold Publishing Corporation, 1959, at pages 132–135, and in U.S. Patents 2,448,565 and 2,560,498.

Preferably, Silastic 50, a product of Dow-Corning Corporation, a methyl silicone polymer milled with a filler and vulcanizing agent, is used in forming the elastomeric core 12 and insulating sheath 30. Extensible cables having cores and insulating sheaths composed of this material have a hardness Shore A of 55, a power factor at 60 cycles of 0.1% and a water absorption of only 0.4%, based on a 70-hour submersion.

A second preferred embodiment of the invention involves producing an extensible cable having a neoprene (polychloroprene) elastomeric core 12 and insulating sheath 30. The neoprene core, which is of the pre-cut or extruded types, is braided under tension, as shown in FIGURE 1, the tension is released and the core is then passed through a coagulating bath such as, for example, an acetic acid bath. The thus treated core is then passed through the coating bath 29 containing a neoprene latex and is cured by passage through the oven 33.

It has been found that neoprene insulating sheath some 20 mils in thickness is produced by the above procedure when a neoprene core with a braided sheath formed thereon is passed quickly through a coagulating bath containing 25 weight percent acetic acid, thence through a coating bath containing 50 weight percent neoprene latex (25 second residence time), and is then cured for two hours during passage through the drying oven at 220° C.

Extensible cables prepared by the above procedure with neoprene cores and insulating sheaths exhibit no differential stresses between core and sheath upon stretching and are highly resistant to oil and chemical agents.

According to a third preferred embodiment of the present invention, a method of producing an extensible coaxial cable, such as that shown in exaggerated cross-section in FIGURE 5, is provided. In the production of such a cable, the elastomeric core 12 is stretched at least 50% of its length in the relaxed state and while in the stretched condition is braided with a sheath composed of the inextensible threads 17 and conductors 18, as shown in FIGURE 1. Thereafter, the insulating sheath 30 is applied thereover, as by the flow-coating procedure previously described. Then a metal conductor shield composed of a flattened ribbon wire 39 is braided over the insulating sheath 30. It is important to use a flattened ribbon wire in order to shield the large extensible surface area of the insulating sheath and to impart sufficient flexibility to the coaxial cable without producing differential internal stresses during extension thereof. Desirably, the flattened wire, say of AWG 20 to 40, is composed of copper, silver, aluminum or alloys thereof such as Cadmium Bronze.

As shown in FIGURE 5, the coaxial cable prepared as above described is, for many applications, provided with an exterior coating 40 of elastomeric material. It is preferred that the core 12, the insulating sheath 30 and the exterior coating 40 provided in such cables be of the same elastomeric material so that internal stresses not be produced due to varying moduli of elasticity.

The extensible coaxial cable, produced by the present method is characterized by uniform impedance and good shielding and is capable of signal transmission throughout the audio range with low power loss.

It will be understood that the present invention provides a method of producing extensible cable by which cable rupture can be prevented and the extent of cable extensibility can be accurately controlled, which method is not to be limited to the specific embodiments herein described except as set forth in the appended claims.

Thus, for example, it will be noted that the insulating and exterior coatings may be formed by extrusion of suitable elastomeric coatings, as well as by the flow-coating thereof. Moreover, plural extensible cables produced, as described hereinabove, may be formed together with a single outer sheath of textile yarn, or elastomeric material, to produce combined extensible cables.

What is claimed is:

1. A method of producing extensible cable which comprises continuously feeding a stretchable neoprene core, placing said core under tension to stretch it to a predetermined extent within the range of from at least 50% of its length in the relaxed state to below the elastic limit of said core, while stretched to said predetermined extent braiding a sheath constituted of conductors and inextensible threads in side by side interlocking relation on said core, releasing the tension on said core to cause it to return to substantially the relaxed state and to contract the braided sheath, and passing the sheathed core through a neoprene coagulating bath and a neoprene latex bath to provide an insulating neoprene coating atop said sheathed core.

2. A method as defined in claim 1, in which said neoprene coagulating bath contains acetic acid.

3. A method of producing extensible coaxial cable which comprises continuously feeding an elastomeric core, placing said core under tension to stretch it to a predetermined extent within the range of from at least 50% of its length in the relaxed state to below the elastic limit of said core, while stretched to said predetermined extent braiding a sheath constituted of conductors and inextensible threads in side by side interlocking relation on said core, releasing the tension on said core to cause it to return to substantially the relaxed state, applying an elastomeric insulating material atop the braided sheath to form an insulating coating thereon, and braiding a metal conductor shield constituted of flattened ribbon wire over said insulating coating.

4. The method as defined in claim 3, including the additional step of applying an elastomeric insulating coating atop said metal conductor shield.

5. A method of producing extensible cable which comprises continuously feeding an elastomeric core, placing said core under tension to stretch it to a predetermined extent within the range of from at least 50% of its length in the relaxed state to below the elastic limit of said core, while stretched to said predetermined extent braiding a sheath constituted of substantially inextensible individual textile threads and conductor wires with the conductor wires and threads in side by side contacting relation and in interlocking engagement, with the number of inextensible textile threads and conductor wires wound per relaxed inch of core being in accordance with the equation $$N = \frac{S(W+D)}{3.3Y}$$

in which N is the said number of windings, S is the desired amount of stretch expressed in percent elongation of said cable from the relaxed state, Y is the maximum cross-sectional dimension of said core expressed in sixteenths of an inch, and $W+D$ is a parameter expressing the sum of the cross-sectional area of the conductor wire and the denier of the inextensible textile threads as compared to No. 40 wire and 100 denier textile threads, for which $W+D$ equals unity, releasing the tension on said core to cause it to return to substantially the relaxed state, and applying an elastomeric insulating material atop the braided sheath.

6. The method as defined in claim 5, in which the core is a stretchable silicone rubber and the insulating material atop the braided sheath is also silicone rubber.

7. A method of producing extensible cable which comprises continuously feeding an elastomeric core, placing said core under tension to stretch it to a predetermined extent within the range of from at least 50% of its length in the relaxed state to below the elastic limit of said core, while stretched to said predetermined extent braiding a sheath constituted of substantially inextensible individual textile threads and conductor wires with the conductor wires and threads in side by side contacting relation and in interlocking engagement, with the number of inextensible textile threads and conductor wires wound per relaxed inch of core being in accordance with the equation $$N = \frac{S(W+D)}{3.3Y}$$

in which N is the said number of windings, S is the desired amount of stretch expressed in percent elongation of said cable from the relaxed state, Y is the maximum cross-sectional dimension of said core expressed in sixteenths of an inch, and $W+D$ is a parameter expressing the sum of the cross-sectional area of the conductor wire and the denier of the inextensible textile threads as compared to No. 40 wire and 100 denier textile threads, for which $W+D$ equals unity, and releasing the tension on said core to cause it to return to substantially the relaxed state.

References Cited in the file of this patent

UNITED STATES PATENTS

| | | |
|---|---|---|
| 1,727,096 | Bourn | Sept. 3, 1929 |
| 2,013,211 | Herkenberg | Sept. 3, 1935 |
| 2,257,649 | Pierce | Sept. 30, 1941 |
| 2,488,527 | Dutcher | Nov. 22, 1949 |
| 2,824,485 | Gregory | Feb. 25, 1958 |